(12) United States Patent
Eckhardt et al.

(10) Patent No.: US 10,691,573 B2
(45) Date of Patent: *Jun. 23, 2020

(54) BUS DATA MONITOR

(71) Applicant: THE BOEING COMPANY, Chicago, IL (US)

(72) Inventors: Josh D. Eckhardt, St. Peters, MO (US); Thomas E. Donofrio, Naugatuck, CT (US); Khaled Serag, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,329

(22) Filed: Apr. 20, 2017

(65) Prior Publication Data
US 2018/0307577 A1 Oct. 25, 2018

(51) Int. Cl.
G06F 11/00 (2006.01)
G06F 11/34 (2006.01)
(Continued)

(52) U.S. Cl.
CPC ........ G06F 11/349 (2013.01); G06F 11/0781 (2013.01); G06F 11/3027 (2013.01); G06F 11/3072 (2013.01); G06F 13/20 (2013.01); G06F 15/76 (2013.01); G06F 15/78 (2013.01); G06F 11/0745 (2013.01); G06F 2201/86 (2013.01)

(58) Field of Classification Search
CPC . H04L 63/1425; H04L 63/20; H04L 63/1433; H04L 12/4013; H04L 47/20; H04L 63/105; H04L 63/107; H04L 63/1416; H04L 63/1441; G06F 21/554; G06F 2221/2113; G06F 11/0751; G06F 21/00; G06F 21/566
See application file for complete search history.

(56) References Cited

U.S. PATENT DOCUMENTS 5,093,910 A * 3/1992 Tulpule ................... G06F 13/30
714/56
5,471,462 A 11/1995 Amador
(Continued)

FOREIGN PATENT DOCUMENTS

EP 2892199 A1 7/2015

OTHER PUBLICATIONS

Extended European Search Report, Application No. 18155459.3-1216, dated Mar. 26, 2018.

Primary Examiner — Loan L. T. Truong
(74) Attorney, Agent, or Firm — Moore IP Law

(57) ABSTRACT

Disclosed is a bus data monitor ("BDM") for use with a MIL-STD-1553 data bus ("1553 bus"). The BDM includes one or more processing units and a computer-readable medium. The computer-readable medium includes encoded thereon computer-executable instructions to cause the one or more processing units to receive data from the 1553 bus in signal communication with the BDM, access a rule set from a computer file stored on the computer-readable medium, compare the received data from the 1553 bus against the rule set, and determine if the received data violates any of the sub-rules defined in the rule set, where the rule set includes a plurality of defined sub-rules.

20 Claims, 4 Drawing Sheets

(51) Int. Cl.
*G06F 13/20* (2006.01)
*G06F 15/78* (2006.01)
*G06F 15/76* (2006.01)
*G06F 11/30* (2006.01)
*G06F 11/07* (2006.01)

(56) References Cited

U.S. PATENT DOCUMENTS

| | | | |
|---|---|---|---|
| 5,479,610 A * | 12/1995 | Roll-Mecak | G01R 31/11 |
| | | | 324/534 |
| 6,212,224 B1 | 4/2001 | Cammarota et al. | |
| 6,598,828 B2 | 4/2003 | Fiebick et al. | |
| 6,633,832 B1 * | 10/2003 | Browen | G06F 13/4269 |
| | | | 702/117 |
| 8,185,944 B2 | 5/2012 | Schnackenberg et al. | |
| 8,286,231 B2 | 10/2012 | Arnold | |
| 8,379,270 B2 | 2/2013 | Tomomatsu | |
| 8,739,270 B1 | 5/2014 | Arnold | |
| 9,071,357 B1 * | 6/2015 | Shi | H04B 10/2575 |
| 10,127,127 B2 * | 11/2018 | Dashtipour | G06F 11/3027 |
| 2004/0078714 A1 * | 4/2004 | Hentsch | B60R 25/00 |
| | | | 714/43 |
| 2005/0148327 A1 | 11/2005 | Perez et al. | |
| 2006/0101184 A1 * | 5/2006 | Hegarty | G06F 11/2007 |
| | | | 710/307 |
| 2006/0112119 A1 * | 5/2006 | Vian | G07C 5/085 |
| 2007/0110053 A1 * | 5/2007 | Soni | H04L 63/0263 |
| | | | 370/389 |
| 2007/0160075 A1 | 7/2007 | Carpassi et al. | |
| 2007/0204337 A1 * | 8/2007 | Schnackenberg | H04L 63/0227 |
| | | | 726/11 |
| 2007/0230542 A1 | 10/2007 | Okada et al. | |
| 2007/0239923 A1 * | 10/2007 | Weber | G06F 13/4004 |
| | | | 710/314 |
| 2008/0059954 A1 * | 3/2008 | Martin | G06F 11/261 |
| | | | 717/134 |
| 2009/0083734 A1 | 3/2009 | Hotra | |
| 2009/0132748 A1 | 5/2009 | Sheffield | |
| 2010/0192217 A1 | 7/2010 | Arnold et al. | |
| 2011/0314231 A1 * | 12/2011 | O'Connor | G06F 13/161 |
| | | | 711/154 |
| 2012/0095663 A1 * | 4/2012 | Roy | F02C 9/263 |
| | | | 701/100 |
| 2012/0226839 A1 * | 9/2012 | Fuoco | G06F 11/3636 |
| | | | 710/110 |
| 2013/0212207 A1 * | 8/2013 | Ong | G06F 15/167 |
| | | | 709/213 |
| 2014/0136589 A1 * | 5/2014 | Wahler | H04L 29/08144 |
| | | | 709/201 |
| 2014/0380433 A1 * | 12/2014 | Yerger | H04L 63/107 |
| | | | 726/4 |
| 2015/0020152 A1 | 1/2015 | Litichever et al. | |
| 2015/0186234 A1 * | 7/2015 | Hofman | G06F 11/221 |
| | | | 714/43 |
| 2015/0270985 A1 | 9/2015 | Sheffield et al. | |
| 2017/0104790 A1 * | 4/2017 | Meyers | H04L 63/20 |
| 2018/0004948 A1 * | 1/2018 | Martin | H04L 63/1425 |
| 2018/0025557 A1 * | 1/2018 | Steinert | B64D 45/00 |
| | | | 701/99 |
| 2018/0144139 A1 * | 5/2018 | Cheng | G06F 21/577 |
| 2018/0285300 A1 * | 10/2018 | Prentice | G06F 13/4018 |
| 2018/0285309 A1 * | 10/2018 | Prentice | G06F 13/4286 |
| 2018/0295148 A1 * | 10/2018 | Mayorgo | H04L 63/1433 |
| 2018/0307645 A1 * | 10/2018 | Eckhardt | H04L 12/40026 |
| 2018/0307845 A1 * | 10/2018 | Eckhardt | G06F 21/60 |
| 2018/0367553 A1 * | 12/2018 | Hayden | H04L 63/1425 |
| 2019/0052658 A1 * | 2/2019 | Clarke | H04L 63/1425 |
| 2019/0098028 A1 * | 3/2019 | Ektare | H04L 63/1416 |
| 2019/0205986 A1 * | 7/2019 | Friedman | G06Q 40/04 |

* cited by examiner

BUS DATA MONITOR

CROSS-REFERENCE TO RELATED APPLICATIONS

This application is related to U.S. Nonprovisional patent application Ser. No. 15/492,426, filed on Apr. 20, 2017, entitled "Multiple Security Level Monitor for Monitoring a Plurality of MIL-STD-1553 Buses with Multiple Independent Levels of Security," by inventors Josh D. Eckhardt, Thomas E. Donofrio, and Khaled Serag, and U.S. Nonprovisional patent application Ser. No. 15/493,022, filed on Apr. 20, 2017, entitled "System and Method of Monitoring Data Traffic on a MIL-STD-1553 Data Bus," by inventors Josh D. Eckhardt, Thomas E. Donofrio, and Khaled Serag, which applications are each incorporated in their entirety in this application by this reference.

BACKGROUND

1. Field

The present disclosure is related to the MIL-STD-1553 data bus, and in particular, monitoring the MIL-STD-1553 data bus.

2. Related Art

MIL-STD-1553 is a military standard published by the United States Department of Defense that defines the mechanical, electrical, and functional characteristics of a serial data bus. The MIL-STD-1553 data bus ("1553 bus") was originally designed as an avionic data bus for use with military avionics, but has also become commonly used in spacecraft on-board data handling ("OBDH") subsystems, both military and civil. The 1553 bus features multiple redundant balanced line physical layers, a network interface, time division multiplexing, half-duplex command/response protocol, and can handle up to 31 Remote Terminals ("RT" devices). The 1553 bus system includes a Bus Controller ("BC") controlling multiple RTs that are all connected together by a data bus providing a single data path between the BC and all the associated RTs. The 1553 bus also includes a bus monitor that cannot transmit messages over the 1553 bus and has the primary role of monitoring and recording the bus transactions without interfering with the operations of the BC or the RTs.

Unfortunately, the known bus monitors for the 1553 bus are passive data gathering devices that record high level metrics and do not have the ability to determine if the data transmitted by the 1553 bus has anomalous activity, malicious data, or otherwise corrupted data. As such, there is a need to address these issues on the '1553 data bus.

SUMMARY

A bus data monitor ("BDM") for use with a MIL-STD-1553 data bus ("1553 bus") is disclosed. The BDM includes one or more processing units and a computer-readable medium. The computer-readable medium includes encoded thereon computer-executable instructions to cause the one or more processing units to receive data from the 1553 bus in signal communication with the BDM, access a rule set from a computer file stored on the computer-readable medium, compare the received data from the 1553 bus against the rule set, and determine if the received data violates any of the sub-rules defined in the rule set, where the rule set includes a plurality of defined sub-rules.

Also disclosed is a data bus. The data bus includes a 1553 bus and a BDM for use with the 1553 bus. The BDM of the data bus includes one or more processing units and a computer-readable medium. The computer-readable medium includes encoded thereon computer-executable instructions to cause the one or more processing units to receive data from the 1553 bus in signal communication with the BDM, access a rule set from a computer file stored on the computer-readable medium, compare the received data from the 1553 bus against the rule set, and determine if the received data violates any of the sub-rules defined in the rule set, where the rule set includes a plurality of defined sub-rules.

In an example of operation, the BDM performs a method that includes receiving the received data from the 1553 bus, accessing a rule set from a computer file stored on the computer-readable medium, where the rule set includes a plurality of defined sub-rules, comparing the received data from the 1553 bus against the rule set, and determining if the received data violates any of the sub-rules defined in the rule set.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is a bus data monitor ("BDM") for use with a MIL-STD-1553 data bus ("1553 bus"). The BDM includes one or more processing units and a computer-readable medium. The computer-readable medium includes encoded thereon computer-executable instructions to cause the one or more processing units to receive data from the 1553 bus in signal communication with the BDM, access a rule set from a computer file stored on the computer-readable medium, compare the received data from the 1553 bus against the rule set, and determine if the received data violates any of the sub-rules defined in the rule set, where the rule set includes a plurality of defined sub-rules.

Also disclosed is a data bus. The data bus includes a 1553 bus and a BDM for use with the 1553 bus. The BDM of the data bus includes one or more processing units and a computer-readable medium. The computer-readable medium includes encoded thereon computer-executable instructions to cause the one or more processing units to receive data from the 1553 bus in signal communication with the BDM, access a rule set from a computer file stored on the computer-readable medium, compare the received data from the 1553 bus against the rule set, and determine if the received data violates any of the sub-rules defined in the rule set, where the rule set includes a plurality of defined sub-rules.

In an example of operation, the BDM performs a method that includes receiving the received data from the 1553 bus, accessing a rule set from a computer file stored on the computer-readable medium, where the rule set includes a plurality of defined sub-rules, comparing the received data from the 1553 bus against the rule set, and determining if the received data violates any of the sub-rules defined in the rule set.

In other words, the BDM utilizes a defined set of rules that define the normal bus behavior of the 1553 bus. Utilizing this set of rules, the BDM monitors the behavior of the 1553 bus for an abnormal bus behavior. The BDM determines that the 1553 bus is behaving in an abnormal way when received data from the 1553 bus violates any of the sub-rules defined in the rule set (i.e., the set of rules). If the BDM determines that the 1553 bus is behaving in an abnormal way, either the BDM may perform additional analysis on the received data from the 1553 bus or notify and transmit the received data or other information to separate processing device (such as, for example, a central computer) through an out of band or back channel signal path (i.e., a communication path that is separate and independent of the 1553 bus). The BDM may also monitor and provide constant bus status of the 1553 bus to the separate processing device.

Figure 1:
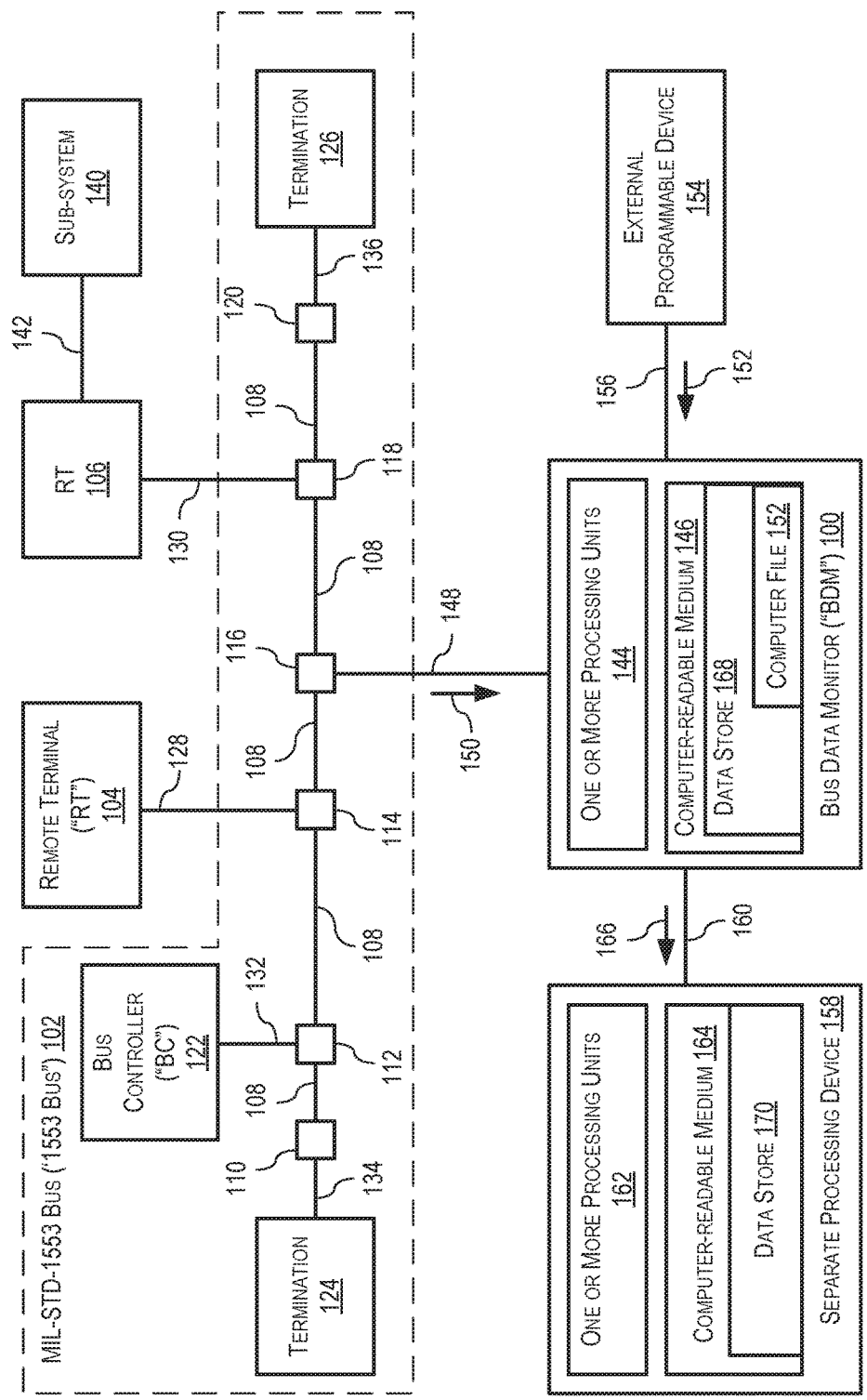
FIG. 1 is system block diagram for an example of an implementation of a bus data monitor ("BDM") for use with a MIL-STD-1553 data bus (1553 bus) is shown in accordance with the present disclosure.

As an example, in FIG. 1, a system block diagram of an example of an implementation of the BDM 100 for use with a 1553 bus 102 is shown in accordance with the present disclosure. The 1553 bus 102 is a military standard that defines the electrical and protocol characteristics for a serial data bus. In general, a data bus is utilized to provide a medium for the exchange of data and information between various systems. The 1553 bus 102 is similar to what the personal computer and office automation industry has dubbed a Local Area Network ("LAN"). The 1553 bus 102 includes a dual redundant balanced line physical layer, employs time division multiplexing and supports a half-duplex command/response protocol. A plurality of remote terminals ("RTs") 104 and 106 or devices, such as, for example, up to 31 RTs or devices, may be in signal communication with the 1553 bus so as to communicate over the 1553 bus 102. In this example, the 1553 bus 102 includes a twinaxial cable 108 having three conductors with a coaxial cable construction with a center conductor and an inner shield surrounding the center conductor and separated from the center conductor by insulation. The twinaxial cable 108 also includes an additional outer shield, such as an outer copper braid, that surrounds the inner shield and is separated from the inner shield by insulation.

The 1553 bus 102 also includes a plurality of connection stubs 110, 112, 114, 116, 118, and 120 that are in signal communication with the RTs 104 and 106, a bus controller ("BC") 122 and terminations 124 and 126. Per the 1553 bus protocols, the connection stubs 110, 112, 114, 116, 118, and 120 are couplers that are in signal communication with external devices (such as, for example, RTs 104 and 106, BC 122, and terminations 124 and 126) either via transformer coupled stubs or direct coupled stubs. In this example, the first RT 104, second RT 106, BC 122, first termination 124, and second termination 126 may be in signal communication with connection stubs 114, 118, 112, 110, and 120 via signal paths 128, 130, 132, 134, and 136, respectively.

The BC 122 is a controller device that includes one or more processors and initiates all the message communication over the 1553 bus 102. The RTs 104 and 106 are devices that may be components, systems, or circuits that either communicate directly with the 1553 bus 102 or act as a bridge between the 1553 bus 102 and another 1553 bus (not shown) or sub-system. As an example, the second RT 106 may act as a bridge between the 1553 bus 102 and a sub-system 140 via signal path 142. As another example, the first RT 104 may be a payload device, navigation system, communication system, radar system, inertial sensors, interfaces for headlights, landing lights, or annunciators, etc. In this example, the terminations 124 and 126 electrically terminate the 1553 bus 102 according to the 1553 bus 102 protocol to minimize the effects of signal reflections that may cause waveform distortion that may result in disruption or intermittent communication failures along the 1553 bus 102.

In this example, the BDM 100 includes one or more processing units 144 and a computer-readable medium 146 and the BDM 100 is in signal communication with the 1553 bus 102 via connection stub 116 via signal path 148. The computer-readable medium 146 has encoded thereon computer-executable instructions that cause the one or more processors units 144 to receive data 150 from the 1553 bus 102, access a rule set from a computer file 152 stored on the computer-readable medium 146, compare the received data 150 against the rule set, and determine if the received data 150 violates any sub-rules defined in the rule set, where the rule set includes a plurality of defined sub-rules.

In this example, the computer file 152 is a dynamically loadable rule file set and the computer-readable medium 146 includes a plurality of dynamically loadable rule file sets to alter the operation of the BDM 100 during operation. Additionally, in this example, the computer file 152 is loaded on the BDM 100 from an external programmable device 154 that is in signal communication with the BDM 100 via signal path 156. In this example, the external programmable device 154 may be an external processing device such as, for example, a computer, controller, or processor, an external system having a processor, permanent or detachable memory device, or other equivalent system capable of storing the computer file 152 and transmitting it to the BDM 100. The computer file 152 may utilizing any type of computer format such as, for example, an Extensible Markup Language ("XML") format or JavaScript Object Notation ("JSON") format.

The BDM 100 may also have additional computer-executable instructions loaded in the computer-readable medium 146 that cause the one or more processing units 144 to analyze the received data 150 that has been determined to violate a sub-rule of the sub-rules defined in the rule set within the computer file 152, determine a sub-system (for example, sub-system 140) that the received data 150 is intended for, attribute a risk level based on the violated sub-rule and the sub-system, and perform deep packet inspections of the received data 150 based on the risk level and sub-system.

Alternatively, the BDM 100 may also be in signal communication with a separate processing device 158 via signal path 160. The separate processing device 158 may also include second one or more processors 162 and second computer-readable medium 164. In this example, the BDM 100 may receive the received data 150 from the 1553 bus 102, access the rule set from the computer file 152, compare the received data 150 against the rule set, and determine if the received data 150 violates any sub-rules defined in the rule set. Once the BDM 100 determines that a violation of sub-rule has occurred, the received data 150 (or a modified version of the received data 150) is transmitted to the separate processing device 158 via signal path 160 as output data 166. Once the separate processing device 158 receives the output data 166, the second computer-readable medium 164 includes computer-executable instructions loaded in the second computer-readable medium 164 that cause the second one or more processing units 162 to analyze the received data 150 that has been determined to violate a sub-rule of the sub-rules defined in the rule set within the computer file 152, determine a sub-system (for example, sub-system 140) that the received data 150 is intended for, attribute a risk level based on the violated sub-rule and the sub-system, and perform deep packet inspections of the received data 150 based on the risk level and sub-system. In this example, the separate processing device 158 may be an external system or sub-system on a vehicle on which the BDM 100 and separate processing device 158 are located. Examples of the separate processing device 158 may include a central computer, flight control system, on-board computer system, etc. As an example of another implementation, the external programmable device 154 may be, or include, one or more external processing units (not shown). Additionally, as a further example, the external programmable device 154 may be the same device as the separate processing unit 158.

In these examples, the BDM 100 utilizes a defined set of rules that define the normal bus behavior of the 1553 bus 102, where the set of rules (i.e., rule set) is defined by the computer file 152. Utilizing this set of rules, the BDM 100 monitors the behavior of the 1553 bus 102 for an abnormal bus behavior. As disclosed earlier, the BDM 100 determines that the 1553 bus 102 is behaving in an abnormal way when the received data 150 from the 1553 bus 102 violates any of the sub-rules defined in the rule set. If the BDM 100 determines that the 1553 bus 102 is behaving in an abnormal way, either the BDM 100 performs additional analysis on the received data 150 from the 1553 bus 102 or the BDM 100 notifies and transmits the output data 166 to separate processing device 158 through signal path 160 which may be an out of band or back channel signal path—i.e., a communication path that is separate and independent of the 1553 bus. If the BDM 100 transmits the output data 166 to the separate processing device 158, the separate processing device 158 then performs the additional analysis on the output data 166 corresponding to the received data 150 from the 1553 bus 102. The BDM 100 may also monitor and provide constant bus status of the 1553 bus 102 to the separate processing device 158.

It is appreciated by those skilled in the art that the circuits, components, modules, and/or devices of, or associated with, the BDM 100 and 1553 bus 102 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

It is further appreciated by those of ordinary skill in the art that one or more processing units 144 and 162 shown in the BDM 100 and separate processing device 158, respectively, may operate in a cluster or other grouped configuration to share resources, balance load, increase performance, provide fail-over support or redundancy, or for other purposes. In general, the one or more processing units 144 and 162 shown in the BDM 100 and separate processing device 158, respectively, may be computing devices that belong to a variety of classes of devices, which may be the same as, or different from each other. Examples of the computing devices include client-type devices, payload systems with computing devices, controllers, and special purpose-type devices. More specifically, the one or more processing units 144 and 162 shown in the BDM 100 and separate processing device 158, respectively, may represent, for example, a Central Processing Unit ("CPU") type processing unit, a Graphics Processing Unit ("GPU") type processing unit, a Field-programmable Gate Array ("FPGA"), another class of Digital Signal Processor ("DSP"), other hardware logic components that may, in some instances, be driven by a CPU, or combination of these computing devices. For example, and without limitation, examples of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, a computer-readable media, such as computer-readable media 144 and/or second computer-readable media 162, may store instructions executable by the one or more processing units 144 and 162. The computer-readable media may also store instructions executable by external processing units (for example, external programmable device 154 in the case of one or more processing units 144) such as by an external CPU, an external GPU, and/or executable by an external accelerator, such as an FPGA type accelerator, a DSP type accelerator, or any other internal or external accelerator. In some examples, at least one CPU, GPU, and/or accelerator may be incorporated in either the BDM 100 or separate processing device 158, while in some examples one or more of a CPU, GPU, and/or accelerator may be external to the BDM 100 or separate processing device 158. As discussed earlier, in one example of an implementation, the separate processing unit 158 may be the same device as the external programmable device 154.

In this disclosure, the computer-readable media 146 and 164 may include computer storage media and/or communication media. The computer storage media 146 and 164 may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, the computer storage media 146 and 164 may include tangible and/or physical forms of media included in BDM 100 or separate processing device 158 and/or hardware component that is part of the BDM 100 or separate processing device 158 or is external to the BDM 100 or separate processing device 158, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In this example, the computer-readable media 146 and 164 includes a data store 168 and 170, respectively. The data stores 168 and 170 may include data storage such as, for example, a database, data warehouse, or other type of structured or unstructured data storage. Additionally, each of the data stores 168 and 170 may include a corpus and/or a relational database with one or more tables, indices, stored procedures, and so forth to enable data access including one or more of hypertext markup language ("HTML") tables, resource description framework ("RDF") tables, web ontology language ("OWL") tables, and/or XML tables, for example. Moreover, each of the data stores 168 and 170 may store data for the operations of processes, applications, components, and/or modules stored in computer-readable media 146 or 164, respectively, and/or executed by one or more processing unit 144 or 162, respectively, and/or accelerator(s). Furthermore, each computer-readable media 146 and 164 may also include an operating system and application programming interface(s) configured to expose the functionality and the received data 150 or output data 166 of the BDM 100 or separate processing device 158 to external devices (not shown) associated with either the BDM 100 or separate processing device 158. Additionally, each computer-readable media 146 and 164 may include one or more modules such as the server module (not shown) and an output module (not shown), although this number of modules is just an example, and the number may vary higher or lower because the functionality described in ids disclosure may be performed by a fewer number of modules or a larger number of modules on one device (such as, for example, the BDM 100 or separate processing device 158) or spread across multiple devices.

Figure 2:
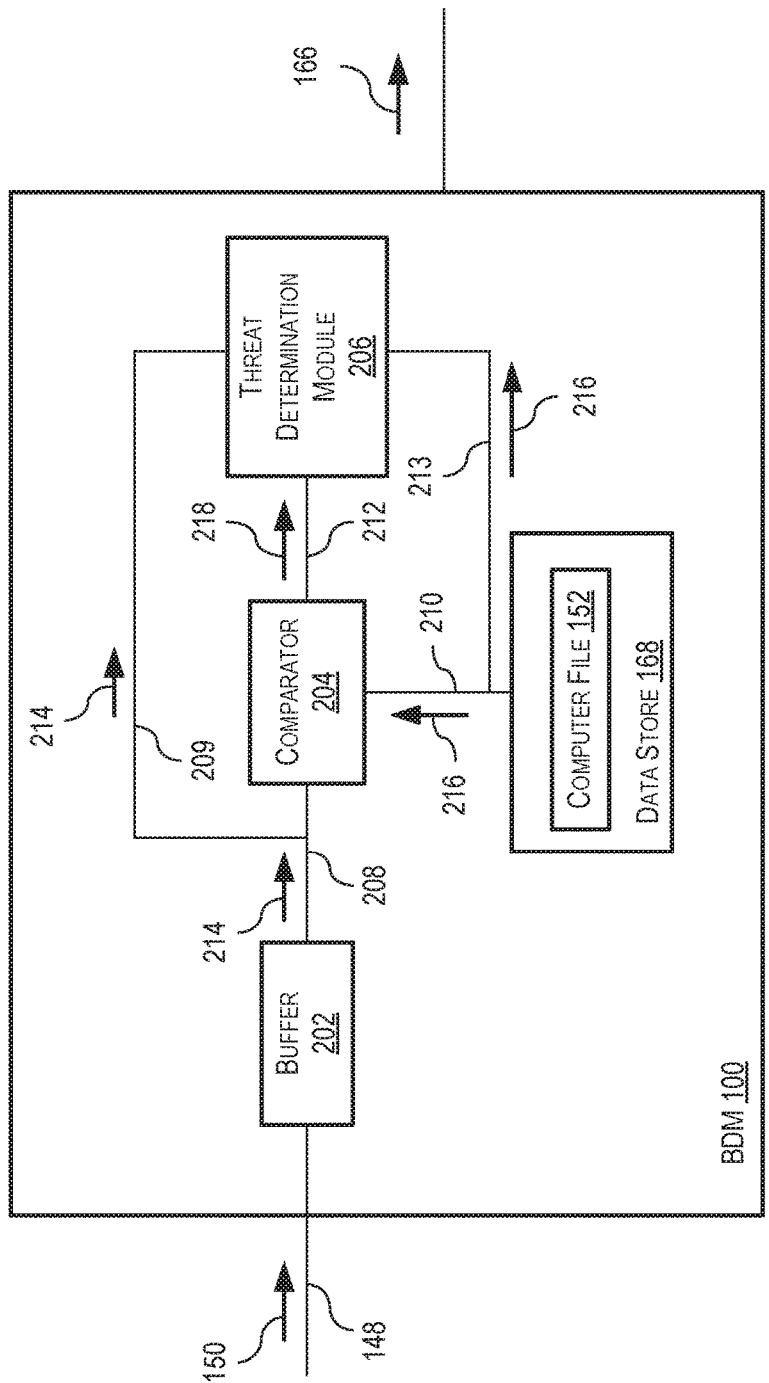
FIG. 2 is a system block diagram of the BDM shown in FIG. 1 in accordance with the present disclosure.

In FIG. 2, a system block diagram of the BDM 100 is shown in accordance with the present disclosure. In this example, the BDM 100 may include the data store 168, a buffer 202, a comparator 204, and a threat determination module 206. In this example, the comparator 204 is in signal communication with buffer 202, data store 168, and threat determination module 206 via signal paths 208, 210, and 212, respectively. The threat determination module 206 is also in signal communication with buffer 202 via signal path 209 and the data store 168 via signal path 213. As shown in FIG. 1, the data store 168 is part of the computer-readable medium 146. The buffer 202 may be a storage or memory unit or device within the BDM 100 and may optionally be part of the computer-readable medium 146 or a separate memory device (not shown) within the BDM 100 that is separate from the computer-readable medium 146.

The comparator 204 is a digital comparator and may be a device, module, component, circuit, or other sub-system configured and/or enabled to receive a message 214 from the buffer 202 and compare the message 214 against a rule 216 from a rule set defined by the computer file 152. The threat determination module 206 is a device, module, component, circuit, or other sub-system configured and/or enabled to determine if a violation of the rule 216 has occurred from an output 218 of comparator 204, the message 214, and the rule 216. It may be, or include, a digital detection module that includes a threshold module, component, device, or circuit. In this example, the comparator 204 and/or threat determination module 206 may be separate devices or a signal device that may be implemented in hardware, software, or both. Moreover, the comparator 204 and/or threat determination module 206 may be part of the one or more processing units 144. The response of the threat determination module 206 may be the output data 166 that is transmitted from the BDM 100.

Figure 3:
FIG. 3 is a table of an example of an implementation of monitor rules for the BDM shown in FIG. 1 in accordance with the present disclosure.

Turning to FIG. 3, a table 300 of an example of an implementation of monitor rules for the BDM 100 is shown in accordance with the present disclosure. In this example, the table 300 has four sections 302, 304, 306, and 308 that correspond to rule numbers for the first section 302, 1553 bus messages for the second section 304, audit functions for the third section 306, and violation triggers for the fourth section 308. In general, the rule number 302 column lists the different rules (for example, rule 216 shown if FIG. 2) that have been established by the rule set in the computer file 152. The rules may be consecutively numbers in the rule number 302 column from, for example, rule 1 310, rule 2 312, to rule 3 314. It is appreciated by those or ordinary skill in the art that in this example only three rules (i.e., rule 1 310, rule 2 312, and rule 3 314) are shown for the convenience of illustration but that the computer file 152 may include any plurality of rules that is greater than three.

In this example, the second section 304 of the table 300 has columns that correspond to different data portions of the messages (such as, for example, message 214) in the received data 150 that are received from the 1553 bus 102. The second section 304 includes a number of sub-sections 316, 318, 320, 322, and 324 that correspond to different information about the messages in the received data 150. In this example, the first sub-section, direction 316 shows whether the rule pertains to an inbound 1553 message or an outbound 1553 message (always from the point of view of the remote terminal). In this example, the second sub-section 318 represents the command word type, and the third sub-section represents the rule threat level 320. The fourth sub-section 322 represents a first command and, if there is an RT to RT transfer, the fifth sub-section 324 represents a second command in a message. In this example, the first command sub-section 322 may include an RT section 326, transfer ("T/R") section 328, sub-address section ("SB") 330, and word count ("WC") section 332. Additional commands sub-sections such as, for example, address information and other information may also be included. Moreover, if there is an RT to RT transfer, the second command sub-section 324 may also include an RT section 334, T/R section 336, SB 338, and WC section 340.

The command word type sub-section 318 specifies the message type in the received data 150 that is received from the 1553 bus 102. The message types include, for example, an RT to RT message, RT to BC message, BC to RT message, and a mode code message. The system threat level 320 is the system level threat that is based on operation of a system threat as determined by the rule set of the computer file 152. In general, the system threat level 320 determines to which threat level, or threat levels, a given rule pertains to. The system threat level 320 values include inputs that have been pre-defined in a system table by a system administrator. Examples of the system threat level 320 may include lists, ranges, or single values. Additionally, there may be a default threat level that is applied at initial operation of the BDM 100 or in the event of an intended or unintended restart. Moreover, there may be a default system-wide threat level that is set to an initial value when messages, in the received data 150, are initially compared to the rules but then may change during operation.

In general, the second section 304 is similar to an index or look-up table in that when messages, in the received data 150, are received by the BDM 100, the second section 304 is utilized to compare the received messages in the received data 150 against the rule data 342, 344, and 346 listed in the table 300 that are identified by the corresponding rule numbers (rule 1 310, rule 2 312, and rule 3 314, respectively). These rules (as listed in the rule number section 302) will either be applied or not applied based on whether the received message matches a corresponding rule. These rules themselves may be numerical values, a list of values, a range of values, or "wild cards." As an example, the rule set may include a wild card rule that defines a rule that is utilized for all threat levels or a selected number of threat levels. For example, a wild card rule may define utilizing a rule for threat levels one through three but not for threat levels four and five. Moreover, if a message is received from the receive data 150 but there is no corresponding rule that matches the message, the BDM 100 will determine that the message has violated a rule.

In this example, if the comparator 204 (from FIG. 2) determines a match between the message 214 and the rule 216 that corresponds, for example, with rule 1 310 with rule data 342, the threat determination module 206 then applies the rule 216 to the message 214 to determine if the data in the message 214 has violated the rule 216. The BDM 100 then utilizes the third section 306 of the table 300, which correspond to audit areas of the rule 310. These audit areas, section 306, include an "audit of fourth section violations" ("A4SV") sub-section 348 and an "audit data capture" sub-section 350. The A4SV sub-section 348 and/or audit data capture sub-section 350 are triggered if message 214 has violated the rule 216. If the rule 216 has been violated, the message 214 may be audited for violations in A4SV sub-section 348 or the entire message 214 may be stored in its entirety in a memory in the BDM 100 with sub-section 350 so that it may be analyzed later.

As an example, the BDM 100 may include five different types of audits: 1) non-existing rule message audit; 2) custom rule violation audit; 3) general rule violation audit; 4) allowed message audit; and 5) general disallowed traffic audit. In this example, a non-existing rule message audit may be triggered when any message from the received data 150 does not match any fields of the second section 304 of a rule. The custom rule violation audit may be triggered when any message from the received data 150 matches all of the fields of the second section 304 of a rule but violates any field of the fourth section 308 and is marked as audit of fourth section violations in the A4SV sub-section 348. The general rule violation audit may be triggered when any message from the received data 150 matches all of the fields of the second section 304 of a rule but violates any field of the fourth section 308 and is not marked as audit of fourth section violations in the A4SV sub-section 348. The allowed message audit may be triggered when any message from the received data 150 matches all of the fields of the second section 304 of a rule and all of fields of the fourth section 308 but is marked for audit by a system administrator. The general disallowed traffic audit may be triggered by a running count of messages from the received data 150 that do not match with any rule or violate a specific rule.

The fourth section 308 may including a threat and/or risk rating sub-section 352, deep inspection sub-section 354, "yes" or "no" sub-section 356, and values sub-section 358. In general, the threat and/or risk rating sub-section 352 is sub-section that is dependent on how sensitive the rule 216 is to certain types of violations by the message 214 and how the rule 216 is determined to operate on the message 214. The threat and/or risk rating sub-section 352 is both a system level threat and a rule level threat and/or risk level that is given a weighting based on the rule 216. In general, the threat and/or risk rating sub-section 352 is a trigger that sets how quickly a rule violation should be reported out where the weighting is related to how sensitive a rule (i.e., the severity of the rule) is so that once violated the system knows how quickly the violation needs to be reported. The "yes" or "no" sub-section 356 is utilized to determine whether the BDM 100 should perform a deep packet inspection of the data in the message 214. If a deep packet inspection 354 is performed, the BDM 100 utilizes individual values of the rule 216 in the values sub-section 358. Examples of the values in the values sub-section 358 may include a validate value or other system administrator predetermined values.

In general, an audit of a message from the received data 150 based on the A4SV sub-section 348 may be triggered if the message violates the deep inspection values of the deep inspection sub-section 354, threat and/or risk rating sub-section 352, or the values of values sub-section 358. Examples of deep inspection conflicts may include a resulting number of elements being larger than the maximum allowed number of elements for a message, an unsigned type of value that may be negative or have a value greater than, for example, "FFFF" (in hexadecimal), having a range beginning value greater than the range end, having a number of values larger than the listed values, having a number of values that is less than the number of listed values, having no range beginning, having no range end, etc.

Figure 4:
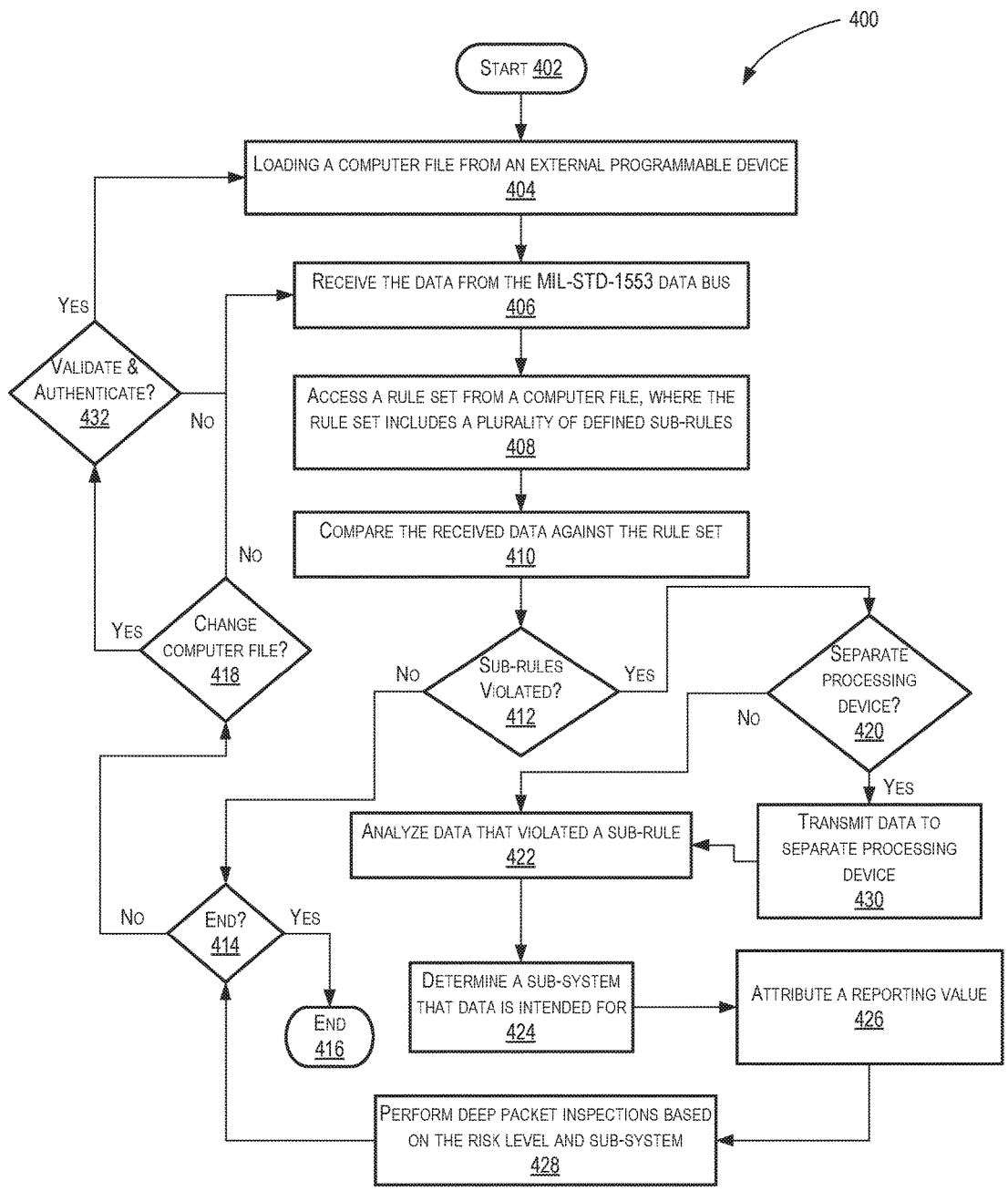
FIG. 4 is a flowchart of an example of an implementation of a method performed by BDM, of FIG. 1, in operation in accordance with the present disclosure.

In FIG. 4, a flowchart 400 of an example of an implementation of a method performed by BDM 100 in operation is shown in accordance with the present disclosure. The method starts 402 by loading 404 the computer file 152 from the external programmable device 154. The BDM 100 then receives 406 the received data 150 from the 1553 bus 102, accesses 408 a rule set from the computer file 152 stored on the computer-readable medium 146 (where the rule set includes a plurality of defined sub-rules), and compares 410 the received data 150 from the 1553 bus 102 against the rule set. As described earlier, the BDM 100 utilizes the "yes" or "no" sub-section 356 to determine whether the BDM 100 should perform an optional deep packet inspection 354 of the data in the message 214. If a deep packet inspection 354 is performed, the BDM 100 utilizes individual values of the rule 216 in the values sub-section 358.

The BDM 100 then determines 412 if the received data 150 violates any of the sub-rules defined in the rule set. If there is no violation, the method determines 414 if the BDM 100 is done monitoring the received data 150. If the BDM 100 is done monitoring the received data 150, the method ends 416.

If, instead, the BDM 100 is not done monitoring the received data 150, the method continues and the BDM 100 determines 418 if the computer file 152 should be changed. If not, the method returns to step 406 and method steps 406 through 412 are repeated. If the received data 150 continues to not violate any sub-rules, the method continues to repeat steps 414 and 418.

If, instead, the received data 150 does violate a sub-rule and there is no separate processing device to analyze the received data 150 (step 420), the BDM 100 analyzes 422 the received data 150 that violated a sub-rule and then determines 424 a sub-system that the received data 150 is intended for (e.g., an RT). The method then attribute 426 a reporting value based on the risk level of a violated sub-rule and sub-system that the received data 150 was intended for that corresponds to threat and/or risk rating sub-section 352. As before, the violation of a sub-rule in combination with the risk level determines how the violation is reported (i.e., a violation of high severity sub-rule may have to be reported immediately). The method then determines if the BDM 100 is done monitoring the received data 150. If the BDM 100 is done monitoring the received data 150, the method ends 416.

If, instead, the BDM 100 is not done monitoring the received data 150, the method continues and the BDM 100 determines 418 if the computer file 152 should be changed. If not, the method returns to step 406 and method steps 406 through 426 are repeated as described earlier.

If, instead, the received data 150 does violate a sub-rule and there is a separate processing device (i.e., separate processing device 158) to analyze the received data 150 (step 420), the BDM 100 transmits 430 the received data 150 (as output data 166) to the separate processing device 158 and the separate processing device 158 analyzes 422 the received data 150 that violated a sub-rule and then determines 424 a sub-system that the received data 150 is intended for (e.g., an RT). The method then attributes 426 the reporting value based on the risk level of a violated sub-rule and sub-system that the received data 150 was intended for and then optionally performs 428 a deep packet inspection based on the risk level and sub-system that the received data 150 was intended for. The method then determines if the BDM 100 is done monitoring the received data 150. If the BDM 100 is done monitoring the received data 150, the method ends 416.

Again, if, instead, the BDM 100 is not done monitoring the received data 150, the method continues and the BDM 100 determines 418 if the computer file 152 should be changed. If not, the method returns to step 406 and method steps 406 through 428 are repeated as described earlier.

If, instead, the BDM 100 determines 418 that the computer file 152 should be changed, the BDM 100 then attempts to validate and authenticate 432 that new computer file 152. If the new computer file 152 is not valid and/or authenticated, the BDM 100 does not utilize the new computer file 152 and continues to utilize the previously loaded computer file 152 and the method repeats steps 406 through 428 including 418 or 416, not both. If, instead, the new computer file 152 is valid and authenticated, the BDM 100 loads 404 the new computer file 152 from the external programmable device 154 and the method repeats steps 406 through 428 and 418 until finally ending 416 once all the received data 150 is monitored.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. An apparatus comprising a bus data monitor (BDM) in signal communication with a MIL-STD-1553 data bus, the BDM comprising:
   one or more processing units; and
   a computer-readable medium storing instructions that when executed cause the one or more processing units to initiate or perform operations comprising:
   receiving data from the MIL-STD-1553 data bus;
   accessing a rule set from a computer file stored on the computer-readable medium, wherein the rule set includes a plurality of defined sub-rules that define normal bus behavior of the MIL-STD-1553 data bus;
   comparing the received data against the rule set; and
   determining that the received data indicates abnormal bus behavior of the MIL-STD-1553 data bus in response to the received data violating any of the sub-rules,
   the operations further comprising:
   in response to a determination that data of the received data violates a sub-rule of the sub-rules, attributing a risk level based on the sub-rule and a sub-system for which the data is intended; and
   after attributing the risk level, performing packet inspection based on the risk level and the sub-system.

2. The apparatus of claim 1, wherein:
   the computer file includes a dynamically loadable rule file set, and the computer-readable medium includes a plurality of dynamically loadable rule file sets configured to alter an operation of the BDM.

3. The apparatus of claim 1, wherein the computer-readable medium is configured to receive the computer file from a programmable device.

4. The apparatus of claim 1, wherein the computer file is associated with an Extensible Markup Language (XML) format.

5. The apparatus of claim 1, wherein the computer file is associated with a JavaScript Object Notation (JSON) format.

6. The apparatus of claim 1, wherein:
the operations include:
analyzing the received data that has been determined to violate the sub-rule; and
determining a particular sub-system for which the received data is intended, and
the packet inspection includes deep packet inspection and is performed based on the particular sub-system.

7. The apparatus of claim 1, wherein the operations further comprise, in response to determining that the received data violates one or more of the sub-rules, transmitting the received data to a processing device for further analysis.

8. The apparatus of claim 1, further comprising a processing device, wherein the processing device includes:
a second one or more processing units; and
a second computer-readable medium storing instructions that when executed cause the second one or more processing units to initiate or perform:
analyzing the received data that has been determined to violate the sub-rule;
determining a particular sub-system for which the received data is intended;
attributing a particular risk level based on the sub-rule and the particular sub-system; and
performing deep packet inspection based on the particular risk level and the particular sub-system.

9. An apparatus comprising:
a MIL-STD-1553 data bus; and
a bus data monitor (BDM) in signal communication with the MIL-STD-1553 data bus, the BDM comprising:
one or more processing units; and
a computer-readable medium storing instructions that when executed cause the one or more processing units to initiate or perform operations comprising:
receiving data from the MIL-STD-1553 data bus;
accessing a rule set from a computer file stored on the computer-readable medium, wherein the rule set includes a plurality of defined sub-rules that define normal bus behavior of the MIL-STD-1553 data bus;
comparing the received data against the rule set; and
determining that the received data indicates abnormal bus behavior of the MIL-STD-1553 data bus in response to the received data violating any of the sub-rules,
the operations further comprising:
in response to a determination that data of the received data violates a sub-rule of the sub-rules, attributing a risk level based on the sub-rule and a sub-system for which the data is intended; and
after attributing the risk level, performing packet inspection based on the risk level and the sub-system.

10. The apparatus of claim 9, wherein:
the computer file includes a dynamically loadable rule file set, and
the computer-readable medium includes a plurality of dynamically loadable rule file sets configured to alter an operation of the BDM.

11. The apparatus of claim 9, wherein the computer-readable medium is configured to receive the computer file from a programmable device.

12. The apparatus of claim 9, wherein the computer file is associated with or has an XML format or a JSON format.

13. The apparatus of claim 9, wherein the operations include:
analyzing the received data that has been determined to violate the sub-rule;
determining a particular sub-system for which the received data is intended;
attributing a particular risk level based on the sub-rule and the particular sub-system; and
performing deep packet inspection based on the particular risk level and the particular sub-system.

14. The apparatus of claim 9, further comprising, in response to determining that the received data violates one or more of the sub-rules, transmit the received data to a processing device for analysis.

15. The apparatus of claim 9, further comprising a processing device, wherein the processing device includes:
a second one or more processing units; and
a second computer-readable medium storing instructions that when executed cause the second one or more processing units to initiate or perform:
analyzing the received data that has been determined to violate a the sub-rule of the sub-rules;
determining a particular sub-system for which the received data is intended;
attributing a particular risk level based on the violated sub-rule and the particular sub-system; and
performing deep packet inspection based on the particular risk level and the particular sub-system.

16. A method for monitoring data on a MIL-STD-1553 data bus in signal communication with a bus data monitor (BDM), the method comprising:
receiving the data from the MIL-STD-1553 data bus;
accessing a rule set from a computer file stored on a computer-readable medium, wherein the rule set includes a plurality of defined sub-rules that define normal bus behavior of the MIL-STD-1553 data bus;
comparing the received data against the rule set;
determining that the received data indicates abnormal bus behavior of the MIL-STD-1553 data bus in response to the received data violating any of the sub-rules;
in response to a determination that data of the received data violates a sub-rule of the sub-rules, attributing a risk level based on the sub-rule and a sub-system for which the data is intended; and
after attributing the risk level, performing packet inspection based on the risk level and the sub-system.

17. The method of claim 16, wherein:
the computer file is a dynamically loadable rule file set,
the computer-readable medium includes a plurality of dynamically loadable rule file sets to alter an operation of the BDM during operation, and
the computer file is associated with or has an XML format or a JSON format.

18. The method of claim 16, further comprising loading the computer file on the BDM from a programmable device.

19. The method of claim 16, further comprising
analyzing the received data that has been determined to violate the sub-rule; and
determining a particular sub-system for which the received data is intended,
wherein the packet inspection includes deep packet inspection and is performed based on the particular sub-system.

20. The method of claim 16, further comprising:
in response to determining that the received data violates one or more of the sub-rules, transmitting the received data to a processing device for further analysis;
analyzing the received data that has been determined to violate the sub-rule with the processing device;
determining a particular sub-system that the received data is intended for with the processing device;
attributing a particular risk level based on the sub-rule and the particular sub-system with the processing device; and
performing deep packet inspection based on the particular risk level and the particular sub-system with the processing device.

\* \* \* \* \*